United States Patent Office 3,539,906
Patented Nov. 10, 1970

3,539,906
EXCITATION OF A SYNCHRONOUS MACHINE IN ACCORDANCE WITH THE MAGNITUDE AND FREQUENCY OF THE STARTING ALTERNATING VOLTAGE
Adolf Haböck, Erlangen, Germany, assignor to Siemens Aktiengesellschaft, Berlin and Munich, Germany, a corporation of Germany
Filed Apr. 26, 1968, Ser. No. 724,529
Claims priority, application Germany, Apr. 29, 1967, S 109,664; Feb. 17, 1968, S 114,190
Int. Cl. H02p *9/30*
U.S. Cl. 322—24                    13 Claims

ABSTRACT OF THE DISCLOSURE

A circuit for exciting a synchronous machine has an excitation winding which is adapted to be short-circuited by contact-free circuit components. The circuit arrangement comprises a current control circuit for controlling the current in the excitation winding of the synchronous machine in accordance with the magnitude and frequency of the starting alternating voltage of the machine. The current control circuit comprises a pair of controlled rectifiers connected in parallel with each other with opposite polarities and in parallel with the excitation winding of the synchronous machine with opposite polarities. Each of the controlled rectifiers has a conductive control connected thereto for controlling the conductivity thereof in accordance with the magnitude of the starting alternating voltage. A controlled rectifier is connected in series with the excitation winding of the synchronous machine. An additional conductive control is connected to the controlled rectifier for controlling the conductivity of the rectifier in accordance with the frequency of the starting alternating voltage.

DESCRIPTION OF THE INVENTION

My invention relates to the excitation of a synchronous machine. More particularly, my invention relates to the excitation of a synchronous machine having its excitation winding connected to a rotary rectifier.

In February 1963 issue of a periodical entitled "Factory," pages 72 and 73, a synchronous machine having excitation equipment with no slip ring or collecting ring is described. The excitation winding is connected in a rectifier bridge circuit to the rotor and rotary winding of an energizing or exciting machine via a rectifier. Thyristors or controlled rectifiers connected in series circuit are connected in parallel with the output of the rectifier. The thyristors are fired in accordance with the starting alternating voltage of the excitation winding, while their circuit is connected to an alternating voltage lead of the rectifier bridge circuit. In order to start the machine, an armature winding is connected to an energizing or exciting three phase system. The rotor of the machine or motor is nonsynchronously accelerated by a damping winding and the acceleration of said rotor induces an alternating voltage in the rotor winding. The alternating voltage in the rotor winding corresponds to a slip frequency which attempts to drive an alternating current of the same frequency through the rotor circuit. During the positive or forward half cycle of the voltage, current flows through the rectifier units of the rectifier circuit. During the negative or reverse half cycle, the current is short-circuited via the series circuit of thyristors.

A Zener diode is connected in the control circuit of the thyristors. When the voltage in the control circuit exceeds the Zener voltage, the thyristors are fired. Overloading is thereby eliminated. During the starting of the synchronous machine or motor, the series circuit of thyristors must control the starting alternating current and must be able to block the rectified output voltage. The thyristors must therefore have an appropriately high rated power. High power thyristors have a relatively long switching delay and require a high firing current.

In known apparatus of the type described, the entire firing current must be controlled by the Zener diodes in the control circuit during the switching delay. The situation is aggravated because the aforementioned rectifier output voltage must also be absorbed by the Zener diodes. Since the Zener diodes are connected in series with the control electrodes of the thyristors, the voltage requirement necessitates the series connection of an appropriately large number of Zener diodes. A considerable difficulty arises due to the fact that in addition, the sum of the Zener voltage of the Zener diode connected to the other thyristor must have twice the magnitude of the series circuit of thyristors in order that both thyristors may be fired simultaneously. Since there is a usual deviation of 10% in the Zener voltage, there is a possibility of a difference in the Zener voltages of the two series circuits from the required magnitude. A deviation in the instants of firing of the Zener diodes increases the possibility of destruction of said diodes.

The aforedescribed difficulties may be overcome by connecting an auxiliary thyristor in series with a resistor and a diode to the control electrode of each thyristor and by connecting the Zener diodes in the control circuits of the auxiliary thyristors. The auxiliary thyristors are fired by the Zener diodes and control the firing of the principal thyristors. The thyristors may be fired substantially independently, provided that the control current of one thyristor provides the control voltage for the other thyristor. The resistors connected in series with the control electrodes of the thyristors have resistance values which are such that the voltage drop produced by the firing current causes the firing of the other auxiliary thyristor without much time delay. Since large firing currents of the thyristors are no longer controlled by the Zener diodes, a limited deviation of the firing instants of the thyristors is no longer detrimental.

The aforedescribed excitation apparatus may be utilized only when a motor races against such a small load torque that it catches up without excitation. The excitation or energization may be only in synchronism with the machine, since premature excitation always results in short-circuiting the exciting or energizing apparatus.

The principal object of the present invention is to provide a new and improved circuit arrangement for exciting a synchronous machine.

An object of the present invention is to provide a circuit arrangement for exciting a synchronous machine in accordance with the magnitude and frequency of the starting alternating voltage.

An object of the present invention is to provide a circuit arrangement for exciting a synchronous machine which circuit arrangement avoids the difficulties encountered in excitation apparatus of known type.

An object of the present invention is to provide a circuit arrangement for exciting a synchronous machine with efficiency, effectiveness and reliability.

My invention is based on my discovery that the excitation or energization of the machine may commence prior to synchronism if the starting alternating voltage of the excitation winding is limited and if a portion of the starting alternating current is simultaneously utilized as an excitation current. I have thus provided a circuit arrangement which controls the current in the excitation winding in accordance with the magnitude and the frequency of the starting alternating voltage. The starting alternating voltage is limited by a parallel connection of a pair of controlled rectifiers or thyristors with opposite polarities. Such a connection is known as an antiparallel connection. The parallel connection of controlled rectifiers is connected in parallel with the excitation winding of the synchronous machine and is controlled in accordance with the magnitude of the starting alternating voltage by auxiliary controlled rectifiers or thyristors. Another controlled rectifier or thyristor is connected in series with the excitation winding of the synchronous machine and is controlled in accordance with the frequency of the starting alternating voltage.

The pair of parallel connected thyristors are fired as soon as the half cycle of the starting alternating voltage exceeds a specific level. The level is adjustable. The series-connected thyristor is fired as soon as the frequency of the starting alternating voltage, and thus the slip, reaches a specific level, which is the catching-up slip, and when the half cycle of the starting alternating voltage has the same direction as the excitation current. The level is adjustable. Contrary to known arrangements, the excitation voltage apparatus connected to the excitation rectifier is fully excited. The rotor of the synchronous machine is thus pulled into synchronism by the excitation current which flows.

In accordance with the present invention, a circuit arrangement for exciting a synchronous machine having an excitation winding which is adapted to be short-circuited by contact-free circuit components, comprises a current control circuit for controlling the current in the excitation winding of the synchronous machine in accordance with the magnitude and frequency of the starting alternating voltage of the machine.

The current control circuit comprises a pair of controlled rectifiers connected in parallel with each other with opposite polarities and in parallel with the excitation winding of the synchronous machine with opposite polarities. Each of the controlled rectifiers has a conductive condition and a non-conductive condition. A conductive control circuit connected to the controlled rectifiers controls the conductivity of the rectifiers in accordance with the magnitude of the starting alternating voltage. A controlled rectifier is connected in series with the excitation winding of the synchronous machine and has a conductive condition and a non-conductive condition. An additional conductive control circuit is connected to the controlled rectifier for controlling the conductivity of the rectifier in accordance with the frequency of the starting alternating voltage.

The additional conductive control circuit of the current control circuit comprises an integrator including a capacitor for providing a control voltage corresponding to the frequency of the starting alternating voltage and a circuit for applying the control voltage to the controlled rectifier. One of the pair of controlled rectifiers has an anode-control path. The conductive control circuit of the current control circuit comprises an auxiliary controlled rectifier connected in parallel with the anode-control path of the one of the controlled rectifiers. The auxiliary controlled rectifier has a conductive condition and a non-conductive condition and has a control electrode and an anode-control path. An anode-control voltage is applied to the auxiliary controlled rectifier. A contact-free circuit component is connected to the control electrode of the auxiliary controlled rectifier for blocking the auxiliary controlled rectifier until the magnitude of a voltage corresponding to the starting alternating voltage is reached.

Each of the pair of controlled rectifiers has an anode-control path. The conductive control circuit of the current control circuit comprises an auxiliary controlled rectifier connected in parallel with the anode-control path of each of the controlled rectifiers. Each of the auxiliary controlled rectifiers has a conductive condition and a non-conductive condition and has a control electrode and an anode-control path. An anode-control voltage is applied to the auxiliary controlled rectifiers. Contact-free circuit components are connected to the control electrode of each of the auxiliary controlled rectifiers for blocking each of the auxiliary controlled rectifiers until the magnitude of a voltage corresponding to the starting alternating voltage is reached.

In another embodiment, the conductive control circuit of the current control circuit comprises a rectifier bridge circuit having a diagonal branch, an output terminal connected to the control electrode of one of the pair of controlled rectifiers and another output terminal connected to the control electrode of the other of the pairs of controlled rectifiers. An auxiliary controlled rectifier is connected in the diagonal branch of the rectifier bridge circuit and has a conductive condition and a non-conductive condition and has a control electrode and an anode-control path. An anode-control voltage is applied to the auxiliary controlled rectifier. A contact-free circuit component is connected to the control electrode of the auxiliary controlled rectifier for blocking the auxiliary controlled rectifier until the magnitude of a voltage corresponding to the starting alternating voltage is reached.

A rotary rectifier may be connected to the excitation winding of the synchronous machine. A resistor may be connected in series with the parallel connected pair of controlled rectifiers. A stationary source of DC voltage may be connected to the excitation winding. The additional conductive control circuit of the current control circuit comprises a resistance-capacitance integrator circuita nd a contact-free circuit component connected between the integrator circuit and the controlled rectifier for supplying a control voltage pulse to the controlled rectifier when the frequency of the starting alternating voltage is at a value of the half wave thereof. The value is adjustable.

The additional conductive control circuit further comprises means for restoring the control voltage pulse during the positive half wave of the starting alternating voltage. The integrator circuit of the additional conductive control circuit comprises a capacitor connected in series circuit arrangement with a resistor and a diode. A diode is connected to the capacitor of the integrator circuit in blocking direction with a charging current of the capacitor and a discharge diode connected in series circuit with a discharge resistor. The series circuit is connected in parallel with the series-connected resistor and diode of the series circuit arrangement.

The additional conductive control circuit of the current control circuit comprises a further conductive control circuit for supplying a firing pulse to the controlled rectifier when the frequency of the starting alternating voltage is zero. The further conductive control circuit comprises an additional integrator for supplying a firing pulse to the controlled rectifier at an adjustable time subsequent to the onset of synchonism. The further conductive control circuit further comprises a stabilizing arrangement for stabilizing the charging voltage of the additional integrator. A capacitor and a resistor are connected in series circuit arrangement. Another resistor is connected in series between the series circuit arrangement and the controlled rectifier. A series connection of a Zener diode and a diode is connected in parallel with the series circuit arrangement.

In order that the present invention may be readily carried into effect, it will now be described with reference to the accompanying drawings, wherein.

Figure 1:
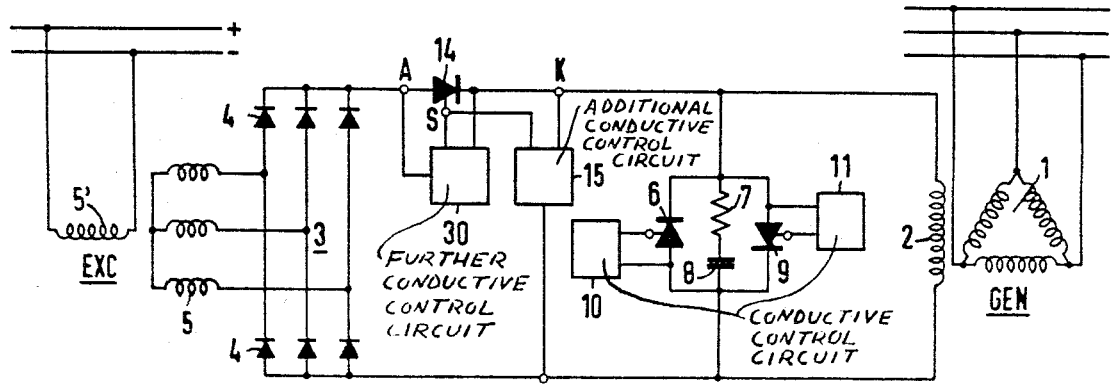
FIG. 1 is a block and circuit diagram of an embodiment of the circuit arrangement of the present invention.

In FIG. 1 the stator winding 1 of a synchronous machine are connected to a three phase power supply system. The excitation winding 2, on the rotor of the synchronous machine, is connected via rectifier apparatus 3 to a source of excitation voltage. The rectifier apparatus 3 comprises a plurality of rectifier units or diodes 4, which may comprise any suitable diodes such as, for example, silicon diodes. The source of excitation voltage comprises a stator winding 5', which is energized by a DC system, and three phase rotor windings 5.

A pair of controlled rectifiers or thyristors 6 and 9 are connected in parallel with each other and with the excitation winding 2, with reversed polarities. Such a connection is known as an anti-parallel connection. Each of the controlled rectifiers 6 and 9 may comprise any suitable electron tube or semiconductor electron switch, or the like, and preferably comprises a semiconductor controlled rectifier or thyristor, which may comprise a silicon controlled rectifier.

The controlled rectifier 6 and 9 are shielded from each other by an RC circuit connected in parallel with and between them. The RC circuit comprises a resistor 7 connected in series with a capacitor 8. Each of the controlled rectifiers 6 and 9 has a conductive condition and a non-conductive condition. Each of the controlled rectifiers 6 and 9 has a control electrode through which the rectifier is fired to its conductive condition. Each of the controlled rectifiers 6 and 9 has an anode-control path from its anode to its control electrode.

A conductive control circuit 10 is connected between the control electrode and the anode of the controlled rectifier 6. A conductive control circuit 11 is connected between the control electrode and the anode of the controlled rectifier 9. The conductive control circuits 10 and 11 may be identical. In accordance with my invention, the conductive control circuit 10 or the conductive control circuit 11 may comprise an auxiliary controlled rectifier or thyristor having a resistor and a diode connected in series circuit arrangement therewith, the series circuit arrangement being connected in parallel with the anode-control path of the controlled rectifier 6 or 9. The auxiliary thyristor, when fired, controls the thyristor 6 or 9 as soon as its anode-control voltage exceeds the Zener voltage of a Zener diode which is connected in parallel with the anode-control path of the auxiliary controlled rectifier.

Figure 4:
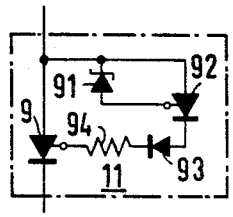
FIG. 4 is a circuit diagram of a circuit arrangement which may be utilized as the block 11 of FIG. 1.

FIG. 4 illustrates the conductive control circuit 11 for controlling the conductive condition of the controlled rectifier 9. The conductive control circuit 10 for the controlled rectifier 6 may be identical with the circuit of FIG. 4. In FIG. 4, an auxiliary thyristor 92 is connected in series circuit arrangement with a diode 93 and a resistor 94. The series circuit arrangement 92, 93, 94 is connected in parallel with the anode-control path of the controlled rectifier 9. A Zener diode 91 is connected in parallel with the anode-control path of the auxiliary controlled rectifier 92.

The controlled rectifier or thyristor 9 may be fired during a half wave or half cycle of the starting alternating voltage as soon as its anode-control voltage exceeds a level which is determined by the Zener voltage of the Zener diode 91. The series connected resistor 94 is relatively small in resistance value, so that the voltage of the anode-control path drops essentially at the Zener diode 91. The auxiliary controlled rectifier 92 and the controlled rectifier 9 are thereupon fired as soon as the voltage of the anode-control path of the controlled rectifier 9 exceeds the Zener voltage of the Zener diode 91.

A common conductive control circuit may be utilized to control the controlled rectifiers 6 and 9. The common conductive control circuit may comprise a rectifier bridge circuit connected between the control electrode of the controlled rectifier 6 and the control electrode of the controlled rectifier 9. The rectifier bridge circuit has an output terminal connected to the first-mentioned control electrode and another output terminal connected to the last-mentioned control electrode.

Figure 5:
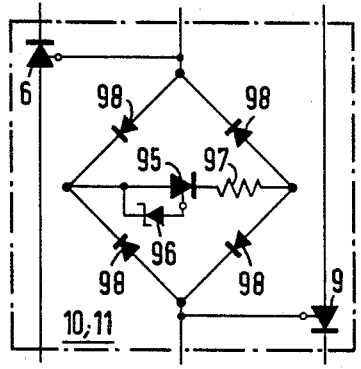
FIG. 5 is a circuit diagram of a circuit arrangement which may be utilized as a combination of the blocks 10 and 11 of FIG. 1.

As shown in FIG. 5, the rectifier bridge comprises a plurality of branches, each of which includes a diode 98. The rectifier bridge has a diagonal branch which comprises an auxiliary controlled rectifier or thyristor 95 connected in series with a resistor 97. A Zener diode 96 is connected in parallel with the anode-control path of the auxiliary controlled rectifier 95. The Zener diode 96 fires the auxiliary thyristor 95 and provides the control current for the thyristors 6 and 9. The rectifier bridge circuit is always connected in series with a diode in the control path of the control rectifiers 6 and 9, so that the control voltage is the same in both directions.

A controlled rectifier 14 is connected in series with the excitation winding 2. An additional conductive control circuit 15 is connected between the control electrode and the cathode of the controlled rectifier 14. The additional conductive control circuit 15 controls the conductivity of the controlled rectifier 14 in accordance with the frequency of the starting alternating voltage of the synchronous machine.

A further conductive control circuit 30 is connected between the control electrode and the anode and cathode of the controlled rectifier 14 and controls the conductive condition of said controlled rectifier. The further conductive control circuit 30 fires the controlled rectifier 14 when the rotary excitation apparatus operates in synchronism for a specific period of time of approximately several seconds, and when said controlled rectifier has not yet been supplied with a pulse from the additional conductive control circuit 15. The period of time is adjustable or variable. An unloaded machine may sometimes start so rapidly that it catches up without passing, in the correct phase position, the slip value adjusted or set in the additional conductive control circuit 15. Since the additional conductive control circuit 15 is then unable to supply a control pulse, the motor would run without excitation and the power supply system would be loaded with a highly inductive idle current. In order to avoid this, a firing pulse is supplied to the control electrode of the controlled rectifier 14 by the further conductive control circuit 30 after a period of time following the last slip period, causing the commencing of the excitation. The period of time is adjustable or variable.

During the non-synchronous starting of the synchronous machine, an alternating voltage of slip frequency is induced in the excitation winding 2. The induced starting alternating voltage attempts to drive an alternating current of the same frequency through the excitation winding 2. Due to such alternating current, voltages of such high magnitudes would occur at the open excitation winding, that the diode rectifier units 4 of the rectifier apparatus 3 and the excitation winding itself would be damaged. Therefore, during the acceleration of the machine, the excitation winding is short-circuited in each half cycle of the starting alternating voltage by a corresponding one of the controlled rectifiers 6 and 9. The excitation winding 2 is short-circuited whenever the starting alternating voltage exceeds a magnitude at which the corresponding Zener diode fires the corresponding auxiliary controlled rectifier in the conductive control circuit of the corresponding controlled rectifiers 6 and 9.

Under certain circumstances, it is of advantage to connect an additional resistor 7' in series with the anti-parallel circuit of the controlled rectifiers 6 and 9. The additional resistor 7' increases the non-synchronous moment of the rotor of the synchronous machine and is therefore especially suitable in apparatus with difficult starting.

Figure 2:
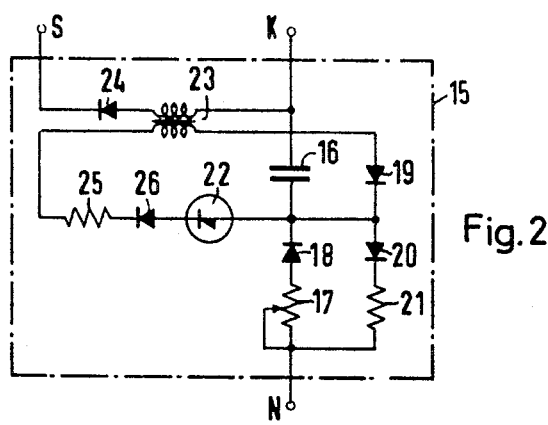
FIG. 2 is a circuit diagram of an embodiment of a circuit arrangement which may be utilized as the block 15 of FIG. 1.

The additional conductive control circuit 15 fires the controlled rectifier 14 as soon as the frequency of the starting alternating voltage decreases below a determined level in the vicinity of synchronism. The determined level may be adjusted or varied. FIG. 2 illustrates an embodiment of an additional conductive control circuit 15. In FIG. 2, an indicator comprises a capacitor 16 which is charged via a variable resistor 17 and a diode 18 in the positive half cycle of the starting alternating voltage. The capacitor 16 is preferably charged, during the positive half cycle, in the direction of the excitation current and is preferably discharged, during the negative half cycle, via additional components such as, for example, a diode 19, a diode 20 and a resistor 21.

The diode 19 is connected to the capacitor 16 and the diode 20 and the resistor 21 are connected in series circuit, said series circuit being connected in parallel with the series connected diode 18 and variable resistor 17. The resistance value of the resistor 17 determines the magnitude of the charging current of the capacitor 16. The voltage provided for charging the capacitor 16 is thus determined by adjusting the movable contact of the variable resistor 17. As soon as the charging voltage of the capacitor 16 reaches a determined level, said capacitor is discharged via a suitable electronic switching component such as, for example, a Shockley diode 22.

The discharge of the capacitor 16 through the Shockley diode 22 energizes the primary winding of a control transformer 23. The secondary winding of the control transformer 23 is then energized by transformer action and provides a firing current which is supplied to the controlled rectifier 14 (FIG. 1) via a diode 24 and a terminal S connected to the control electrode of said controlled rectifier. The primary winding of the transformer 23 is connected in series with the Shockley diode 22, a diode 26, a resistor 25 and the diode 19. The resistor 25 functions as a current limiter.

Figure 3:
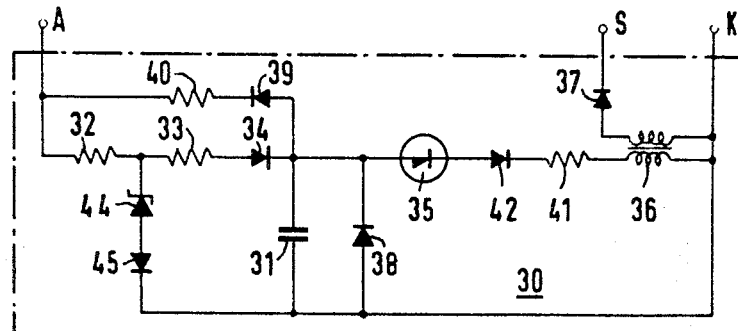
FIG. 3 is a circuit diagram of a circuit arrangement which may be utilized as the block 30 of FIG. 1.

A further conductive control circuit 30 is illustrated in FIG. 3. The further conductive control circuit 30 comprises an integrator which fires the controlled rectifier 14 (FIG. 1) in accordance with its blocking voltage. In order to accomplish this, the measuring value may be the anode-cathode voltage of the controlled rectifier 14. The integrator comprises a resistor 33 and a capacitor 31, which serve as an RC time circuit, and a Shockley diode 35, which functions as a discharge component.

The resistor 33 and the Shockley diode 35 are connected in series with a resistor 32, a diode 34, a diode 42, a resistor 41 and the primary winding of a control transformer 36 between the terminal A, which is connected to the anode of the controlled rectifier 14 (FIG. 1), and the terminal K, which is connected to the cathode of said controlled rectifier. The capacitor 31 is connected in parallel with a diode 38 and with a series connection of a Zener diode 44 and a diode 45. The capacitor 31 is connected in series with a diode 39 and a resistor 40. The diode 39 and resistor 40 are connected in series with each other and the series connection is connected in parallel with the series connection of the resistors 32 and 33 and the diode 34. The secondary winding of the control transformer 36 is connected in series with a diode 37 to the terminal S, which is connected to the control electrode of the controlled rectifier 14 (FIG. 1).

In non-synchronous operation, the integrator is charged via the resistor 32, the resistor 33 and the diode 34, during the positive half cycle of the starting alternating voltage. The integrator is discharge via the diode 38, the diode 39 and the resistor 40, during the negative half cycle of the starting alternating voltage. As soon as the excitation voltage remains as a positive anode voltage during the synchronous operation of the machine, the capacitor 31 charges up to the breakdown voltage of the Shockley diode 35 and fires the controlled rectifier 14 (FIG. 1) when it discharges. The capacitor 31, in discharging, fires the controlled rectifier 14 via the control transformer 36.

In order to stabilize the charging process, the Zener diode 44 and the series-connected diode 45 are connected to the anode-cathode path of the controlled rectifier 14 (FIG. 1) via the resistor 32. This makes the charging of the capacitor 31 independent of the excitation voltage and thus makes it possible to provide the RC integrator with a pure time dependence.

Figure 6:
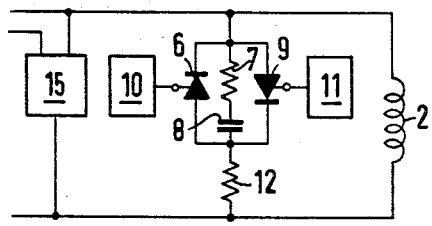
FIG. 6 is a block diagram of a modification of part of the circuit arrangement of FIG. 1.

In the modification of FIG. 6, an additional resistor 12 is connected in series with the resistor 7 and the capacitor 8 of the embodiment of FIG. 1. The resistor 12 is therefore connected in series with the anti-parallel connection of the controlled rectifiers 6 and 9. The resistor 12 is added to the circuit when a synchronous machine with a heavy starting characteristic is utilized.

Figure 7:
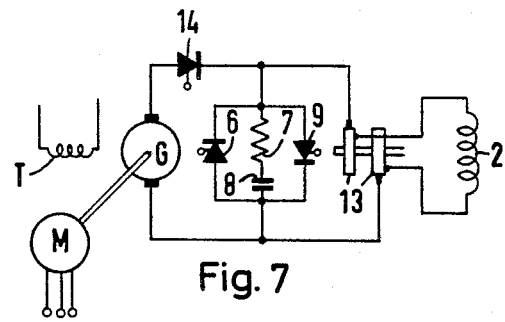
FIG. 7 is a circuit arrangement illustrating a use of the circuit arrangement of FIG. 1.

The circuit arrangement of the present invention has been described in an embodiment wherein the excitation winding 2 is connected to a rotary rectifier 3. My circuit arrangement may, however, utilize an excitation winding which is connected via slip rings or collecting rings to a DC generator or to a stationary rectifier. In FIG. 7, the excitation winding 2 is connected to a stationary source of excitation voltage via slip rings or collecting rings 13. The source of excitation voltage may comprise, for example, an excitation transformer T, a DC generator G and a driving motor M.

Figure 8:
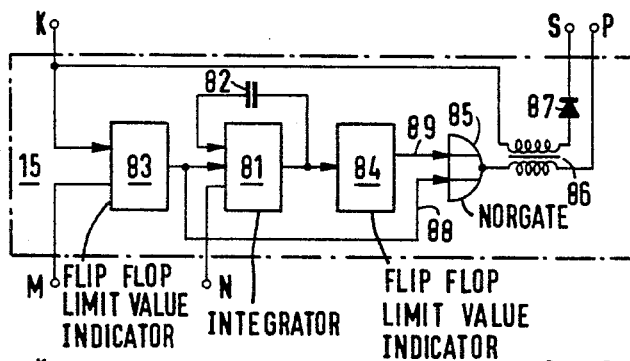
FIG. 8 is a block diagram of another embodiment of a circuit arrangement which may be utilized as the block 15 of FIG. 1.

In the embodiment of the additional conductive control circuit 15 of FIG. 8, a bistable multivibrator or flip flop 83 is connected to the terminal K, which is connected to the cathode of the controlled rectifier 14 (FIG. 1). The flip flop 83 functions as a limit value indicator. An integrator 81 is connected to the output of the limit value indicator 83 and has a capacitive feedback coupling 82 connected between its output and its input. Another limit value indicator 84 is connected to the output of the integrator 81. The output of the first limit value indicator 83 is connected to an input of a NOR gate 85 via a lead 88 and the output of the second limit value indicator 84 is connected to another input of said NOR gate via a lead 89. The output of the NOR gate 85 is connected to the primary winding of a control transformer 86. The secondary winding of the control transformer 86 is connected via a diode 87 to the terminal S which is connected to the control electrode of the controlled rectifier 14 (FIG. 1).

The circuit arrangement of FIG. 8 functions as the additional conductive control circuit 15 of FIG. 1 and controls the controlled rectifier 14 in accordance with the frequency of the starting alternating voltage of the synchronous machine. Whereas the voltage is measured by an integrator in the embodiment of FIG. 2, time is measured between two specified points of the starting alternating current in the embodiment of FIG. 8. The two specified points may be, for example, zero passages of the starting alternating current. The time is measured as a voltage of an amplifier connected as the integrator 81, with the capacitive feedback coupling 82. The integrator 81 always integrates from the commencement of the negative half cycle of the starting alternating current a determined voltage value which is restored during the positive half cycle of said starting alternating current.

The flip flop 83 is switched, during the starting of the machine, in its stable condition due to the alternating positive and negative voltage points. The output voltage of the integrator 81 is measured by the second limit value indicator 84 which also comprises a bistable multivibrator or flip flop. The flip flop 84 switches its stable condition upon reaching a level of the critical slip. The critical slip level is adjustable. When the flip flop 84 changes its stable condition, it releases pulse information via the NOR gate 85. The switching of the limit value indicator 83 to its reset condition, which indicates the commencement of the positive half cycle, also releases pulse information via the NOR gate 85. The output signal of the NOR gate 85 functions as the firing pulse for the controlled rectifier 14 (FIG. 1) via the control transformer 86, the diode 87, the terminal S and the control electrode of said controlled rectifier. Since the duration or period of the negative half cycle of the starting alternating current is being measured, after reaching the critical slip the pulse may be supplied in the correct phase position at the commencement of the positive half cycle of the starting alternating current.

Figure 9:
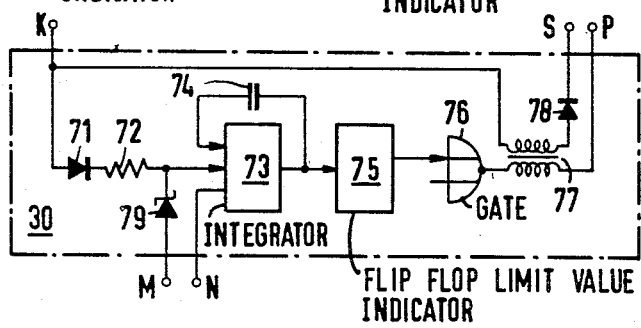
FIG. 9 is a block diagram of another embodiment of a circuit arrangement which may be utilized as the block 30 of FIG. 1.

In the embodiment of the further conductive control circuit 30 of FIG. 9, the terminal K, which is connected to the cathode of the controlled rectifier 14 (FIG. 1), is connected via a diode 71 and resistor 72 to the input of an integrator 73. The integrator 73 is similar to the integrator 81 of FIG. 8 and has a capacitive feedback coupling 74 connected between its output and its input. The output of the integrator 73 is connected to the input of a flip flop limit value indicator 75. The output of the limit value indicator 75 is connected to the input of a gate 76. The output of the gate 76 is connected to the primary winding of a control transformer 77. The secondary winding of the control transformer 77 is connected through a diode 78 to the terminal S of the control electrode of the controlled rectifier 14 (FIG. 1). A Zener diode 79 is connected in parallel to the input of the integrator 73.

The circuit arrangement of FIG. 9 functions in the same manner as the circuit arrangement of FIG. 3, as the further conductive control circuit 30. Thus, the circuit arrangement of FIG. 9 measures the condition of synchronism. At non-synchronous starting, a positive voltage point appears in the half cycle at the excitation winding 2 and is utilized to restore the integrator 73. As soon as there is a zero voltage at the excitation winding, during synchronism, for longer than a determined period of time, which period of time may be adjusted, the integrator 73 may reach the voltage limit set by the limit value indicator 75. The limit value indicator 75 comprises a bistable multivibrator or flip flop, as in FIG. 8. As soon as the flip flop 75 switches in its stable condition, it produces an output signal which is supplied via the gate 76 to the control electrode of the controlled rectifier 14 (FIG. 1), via the control transformer 77, the terminal S and the diode 78. The actuating voltage for restoring the integrator 73 is adjustable by the Zener voltage of the Zener diode 79. The gate 76 is a NOR gate which is operated as a reversing stage.

While the invention has been described by means of specific examples and in specific embodiments, I do not wish to be limited thereto, for obvious modifications will occur to those skilled in the art without departing from the spirit and scope of the invention.

I claim:

1. A circuit arrangement for exciting a synchronous machine having an excitation winding, said excitation winding being adapted to be short-circuited by contact-free circuit components, said circuit arrangement comprising current control means for controlling the current in the excitation winding of the synchronous machine in accordance with the magnitude and frequency of the starting alternating voltage of said machine, said current control means comprising a pair of controlled rectifiers connected in parallel with each other with opposite polarities and in parallel with the excitation winding of the synchronous machine with opposite polarities, each of said controlled rectifiers having a conductive condition and a non-conductive condition, conductive control means connected to said controlled rectifiers for controlling the conductivity of said rectifiers in accordance with the magnitude of said starting alternating voltage, a ontrolled rectifier connected in series with the excitation winding of said synchronous machine, said controlled rectifier having a conductive condition and a non-conductive condition, and additional conductive control means connected to said controlled rectifier for controlling the conductivity of said rectifier in accordance with the frequency of said starting alternating voltage.

2. A circuit arrangement for exciting a synchronous machine having an excitation winding, said excitation winding being adapted to be short-circuited by contact-free circuit components, said circuit arrangement comprising current control means for controlling the current in the excitation winding of the synchronous machine in accordance with the magnitude and frequency of the starting alternating voltage of said machine, said current control means comprising a pair of controlled rectifiers connected in parallel with each other with opposite polarities and in parallel with the excitation winding of the synchronous machine with opposite polarities, each of said controlled rectifiers having a conductive condition and a non-conductive condition, conductive control means connected to said controlled rectifiers for controlling the conductivity of said rectifiers in accordance with the magnitude of said starting alternating voltage, a controlled rectifier connected in series with the excitation winding of said synchronous machine, said controlled rectifier having a conductive condition and a non-conductive condition, and additional conductive control means connected to said controlled rectifier for controlling the conductivity of said rectifier in accordance with the frequency of said starting alternating voltage, said additional conductive control means of said current control means comprising integrator means of said current control means comprising integrator means including a capacitor for providing a control voltage corresponding to the frequency of said starting alternating voltage and circuit means for applying said control voltage to said controlled rectifier.

3. A circuit arrangement as claimed in claim 2, wherein the additional conductive control means of said current control means comprises further conductive control means for supplying a firing pulse to said controlled rectifier when the frequency of said starting alternating voltage is zero.

4. A circuit arrangement as claimed in claim 3, wherein said further conductive control means comprises additional integrator means for supplying a firing pulse to said controlled rectifier at an adjustable time subsequent to the onset of synchronism.

5. A circuit arrangement as claimed in claim 4, wherein said further conductive control means further comprises stabilizing means for stabilizing the charging voltage of said additional integrator means.

6. A circuit arrangement as claimed in claim 4, wherein said further conductive control means comprises a capacitor and a resistor connected in series circuit arrangement with said capacitor, another resistor connected in series between said series circuit arrangement and said controlled rectifier, and a series connection of a Zener diode and a diode, said series connection being connected in parallel with said series circuit arrangement.

7. A circuit arrangement for exciting a synchronous machine having an excitation winding, said excitation winding being adapted to be short-circuited by contact-free circuit components, said circuit arrangement comprising current control means for controlling the current in the excitation winding of the synchronous machine in accordance with the magnitude and frequency of the starting alternating voltage of said machine, said current control means comprising a pair of controlled rectifiers connected in parallel with each other with opposite polarities and in parallel with the excitation winding of the synchronous machine with opposite polarities, each of said controlled rectifiers having a conductive condition and a non-conductive condition, conductive control means connected to said controlled rectifiers for controlling the conductivity of said rectifiers in accordance with the magnitude of said starting alternating voltage, a controlled rectifier connected in series with the excitation winding of said synchronous machine, said controlled rectifier having a conductive condition and a non-conductive condition, and additional conductive control means connected to said controlled rectifier for controlling the conductivity of said rectifier in accordance with the frequency of said starting alternating voltage, one of said pair of controlled rectifiers having an anode-control path and the conductive control means of said current control means comprising an auxiliary controlled rectifier connected in parallel with the anode-control path of said one of said controlled rectifiers, said auxiliary controlled rectifier having a conductive condition and a non-conductive condition and having a control electrode and anode-control path, means for applying an anode-control voltage to said auxiliary controlled rectifier, and contact-free circuit means connected to the control electrode of said auxiliary controlled rectifier for blocking said auxiliary controlled rectifier until the magnitude of a voltage corresponding to said starting alternating voltage is reached.

8. A circuit arrangement for exciting a synchronous machine having an excitation winding, said excitation winding being adapted to be short-circuited by contact-free circuit components, said circuit arrangement comprising current control means for controlling the current in the excitation winding of the synchronous machine in accordance with the magnitude and frequency of the starting alternating voltage of said machine, said current control means comprising a pair of controlled rectifiers connected in parallel with each other with opposite polarities and in parallel with the excitation winding of the synchronous machine with opposite polarities, each of said controlled rectifiers having a conductive condition and a nonconductive condition, conductive control means connected to said controlled rectifiers for controlling the conductivity of said rectifiers in accordance with the magnitude of said starting alternating voltage, a controlled rectifier connected in series with the excitation winding of said synchronous machine, said controlled rectifier having a conductive condition and a non-conductive condition, and additional conductive control means connected to said controlled rectifier for controlling the conductivity of said rectifier in accordance with the frequency of said starting alternating voltage, each of said pair of controlled rectifiers having an anode-control path and the conductive control means of said current control means comprising an auxiliary controlled rectifier connected in parallel with the anode-control path of each of said controlled rectifiers, each of said auxiliary controlled rectifiers having a conductive condition and a non-conductive condition and having a control electrode and an anode-control path, means for applying an anode-control voltage to said auxiliary controlled rectifiers, and contact-free circuit means connected to the control electrode of each of said auxiliary controlled rectifiers for blocking each of said auxiliary controlled rectifiers until the magnitude of a voltage corresponding to said starting alternating voltage is reached.

9. A circuit arrangement for exciting a synchronous machine having an excitation winding, said excitation winding being adapted to be short-circuited by contact-free circuit components, said circuit arrangement comprising current control means for controlling the current in the excitation winding of the synchronous machine in accordance with the magnitude and frequency of the starting alternating voltage of said machine, said current control means comprising a pair of controlled rectifiers connected in parallel with each other with opposite polarities and in parallel with the excitation winding of the synchronous machine with opposite polarities, each of said controlled rectifiers having a conductive condition and a non-conductive condition, conductive control means connected to said controlled rectifiers for controlling the conductivity of said rectifiers in accordance with the magnitude of said starting alternating voltage, a controlled rectifier connected in series with the excitation winding of said synchronous machine, said controlled rectifier having a conductive condition and a non-conductive condition, and additional conductive control means connected to said controlled rectifier for controlling the conductivity of said rectifier in accordance with the frequency of said starting alternating voltage, each of said pair of controlled rectifiers having a control electrode and an anode-control path and the conductive control means of said current control means comprising a rectifier bridge circuit having a diagonal branch, an output terminal connected to the control electrode of one of said pair of controlled rectifiers and another output terminal connected to the control electrode of the other of said pair of controlled rectifiers, an auxiliary controlled rectifier connected in the diagonal branch of said rectifier bridge circuit, said auxiliary controlled rectifier having a conductive condition and a non-conductive condition and having a control electrode and an anode-control path, means for applying an anode-control voltage to said auxiliary controlled rectifier, and contact-free circuit means connected to the control electrode of said auxiliary controlled rectifier for blocking said auxiliary controlled rectifier until the magnitude of a voltage corresponding to said starting alternating voltage is reached.

10. A circuit arrangement for exciting a synchronous machine having an excitation winding, said excitation winding being adapted to be short-circuited by contact-free circuit components, said circuit arrangement comprising current control means for controlling the current in the excitation winding of the synchronous machine in accordance with the magnitude and frequency of the starting alternating voltage of said machine, said current control means comprising a pair of controlled rectifiers connected in parallel with each other with opposite polarities and in parallel with the excitation winding of the synchronous machine with opposite polarities, each of said controlled rectifiers having a conductive condition and a non-conductive condition, conductive control means connected to said controlled rectifiers for controlling the conductivity of said rectifiers in accordance with the magnitude of said starting alternating voltage, a controlled rectifier connected in series with the excitation winding of said synchronous machine, said controlled rectifier having a conductive condition and a non-conductive condition, and additional conductive control means connected to said controlled rectifier for controlling the conductivity of said rectifier in accordance with the frequency of said starting alternating voltage, the additional conductive control means of said current control means comprising a resistance-capacitance integrator circuit and a contact-free circuit component connected between said integrator circuit and said controlled rectifier for supplying a control voltage pulse to said controlled rectifier when the frequency of said starting alternating voltage is at an adjustable value of the half wave thereof.

11. A circuit arrangement as claimed in claim 10, wherein the additional conductive control means of said current control means further comprises means for restoring said control voltage pulse during the positive half wave of said starting alternating voltage.

12. A circuit arrangement as claimed in claim 10, wherein the integrator circuit of the additional conductive control means of said current control means comprises a capacitor connected in series circuit arrangement with a resistor and a diode and wherein the additional conductive control means of said current control means further comprises a diode connected to the capacitor of said integrator circuit in blocking direction with a charging current of said capacitor and a discharge diode connected in series circuit with a discharge resistor, said series circuit being connected in parallel with the series-connected resistor and diode of said series circuit arrangement.

13. A circuit arrangement for exciting a synchronous machine having an excitation winding, said excitation winding being adapted to be short-circuited by contact-free circuit components, said circuit arrangement comprising current control means for controlling the current in the excitation winding of the synchronous machine in accordance with the magnitude and frequency of the starting alternating voltage of said machine, said current control means comprising a pair of controlled rectifiers connected in parallel with each other with opposite polarities and in parallel with the excitation winding of the synchronous machine with opposite polarities, each of said controlled rectifiers having a conductive condition and a non-conductive condition, conductive control means connected to said controlled rectifiers for controlling the conductivity of said rectifiers in accordance with the magnitude of said starting alternating voltage, a controlled rectifier connected in series with the excitation winding of said synchronous machine, said controlled rectifier having a conductive condition and a non-conductive condition, and additional conductive control means connected to said controlled rectifier for controlling the conductivity of said rectifier in accordance with the frequency of said starting alternating voltage, and a resistor connected in series with the parallel-connected pair of controlled rectifiers.

References Cited

UNITED STATES PATENTS

| | | | |
|---|---|---|---|
| 3,121,836 | 2/1964 | Rosenberry | 322—24 |
| 3,369,171 | 2/1968 | Lane | 322—68 |

ORIS L. RADER, Primary Examiner

H. HUBERFELD, Assistant Examiner

U.S. Cl. X.R.

322—28, 32, 68, 73